W. E. H. HUMPHRYS.
CUSHION TIRE.
APPLICATION FILED JUNE 15, 1916.

1,248,863.

Patented Dec. 4, 1917.
2 SHEETS—SHEET 1.

Inventor
William E. H. Humphrys,
By
Atty.

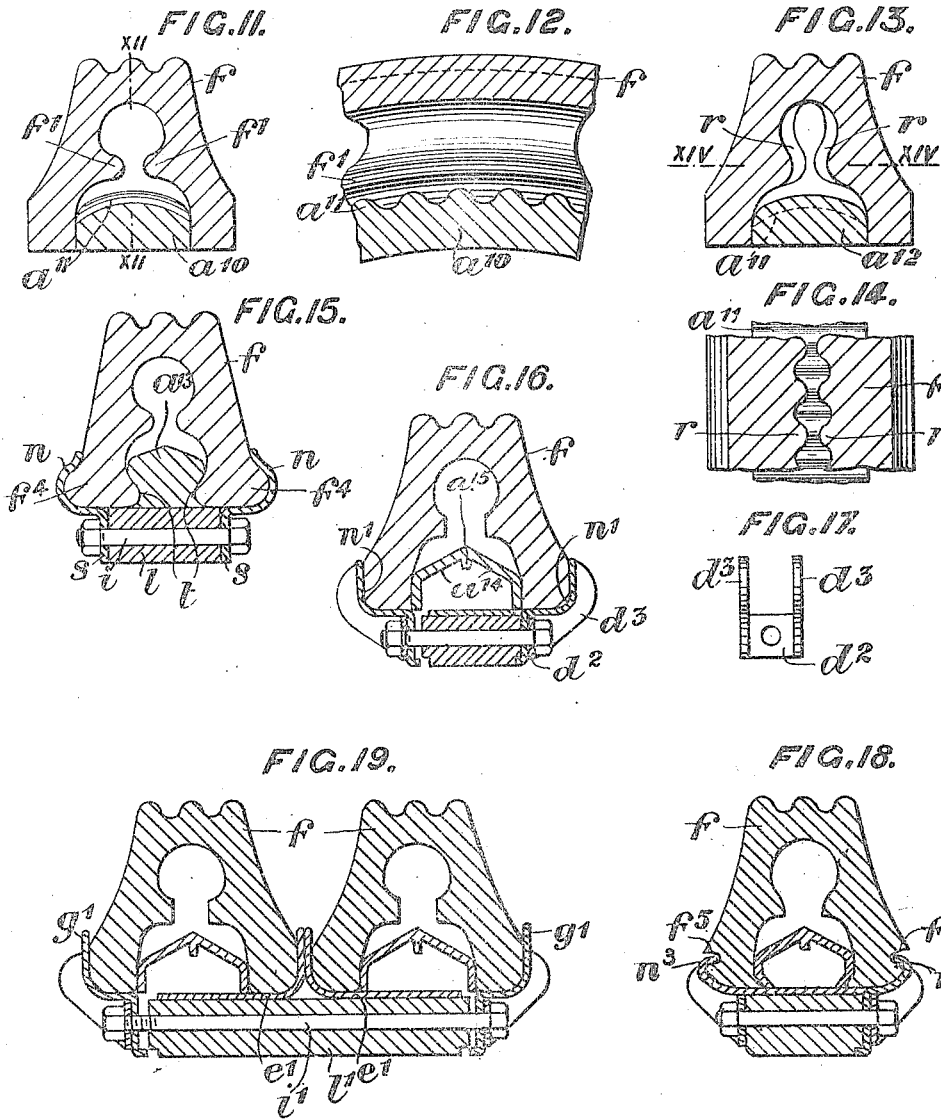

UNITED STATES PATENT OFFICE.

WILLIAM EVANS HUGH HUMPHRYS, OF HENDON, ENGLAND.

CUSHION-TIRE.

1,248,863. Specification of Letters Patent. Patented Dec. 4, 1917.

Application filed June 15, 1916. Serial No. 103,757.

*To all whom it may concern:*

Be it known that I, WILLIAM EVANS HUGH HUMPHRYS, a subject of the King of Great Britain and Ireland, residing at Cranbourne Lodge, Hendon, in the county of Middlesex, England, have invented certain new and useful Improvements in Cushion-Tires, of which the following is a specification, reference being had therein to the accompanying drawing.

This invention relates to improvements in cushion tires and the object is to produce a hollow tire, which while being extremely elastic or resilient is nevertheless not liable to undue distortion and is capable of withstanding lateral stresses such as are imposed on the tire when a loaded vehicle travels around a curve.

According to this invention the side walls of the tire are thickened between the tread and the base or feet and the said walls are, at the base, separated by a distance piece, abutment or filling which has a peripheral surface of such an arched shape that when the tire tends to deform excessively under the action of load or lateral stress or under the combined action of load and lateral stress, the surface or surfaces of both side walls or of one side wall of the inner space come or comes into contact with the surface of the arch-shaped distance piece or filling near the crown of the arch and any excessive deformation is thereby resisted. Preferably, the thickening of each side wall is in the form of an annular ridge of such a formation as to come into contact with the distance piece or abutment when the tire tends to be considerably deformed under a load or a lateral stress. Or, alternatively, the thickening of the side walls may be in the form of radial ribs or protuberances. The distance piece or abutment may be hollow or solid and made in one piece or in sections, preferably connected together or unconnected with each other, and the whole distance piece or the parts thereof, if it be made in sections, may be loose on the rim or felly of the wheel or may be bolted or otherwise secured thereto. Or the abutment may be integral with the rim or felly of the wheel. The surface of the abutment co-acting with the inner walls of the tire is suitably convex, or approximately convex, or it is made, around its periphery, with two surfaces angular to each other and to the plane of the wheel. The abutment is suitably made or formed of metal, wood, rubber or other suitable material and separate from or integral with the tire or the rim or felly of the wheel. The abutment need not be seated on the rim, if made separate, but rubber or other seating may be interposed. The surface of the abutment may, if desired, be provided with ribs or protuberances for co-acting with the side walls of the tire. The sides of the abutment may, moreover, be recessed to engage with correspondingly formed feet or bases of the tire.

And in order that the invention may be more easily understood reference will be made to the accompanying drawings, of which:—

Figs. 9, 10 and 11 are transverse sections of other modifications of tires.

Fig. 12 is a sectional elevation on the line XII—XII Fig. 11.

Fig. 13 is a transverse section of another modified form of tire and

Fig. 14 is a part circular section on the line XIV—XIV, Fig. 13.

Fig. 15 is a transverse section of another modification.

Fig. 16 is a transverse section of another modified form and

Fig. 17 is a side elevation of a clip or bracket.

Fig. 18 is a transverse section of yet another modification and

Fig. 19 is a similar view of a wheel with twin tires.

Figure 1:
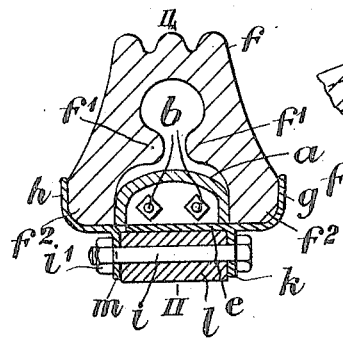
Figure 1 is a transverse section of a part of a wheel provided with a tire constructed according to this invention.
Figure 2:
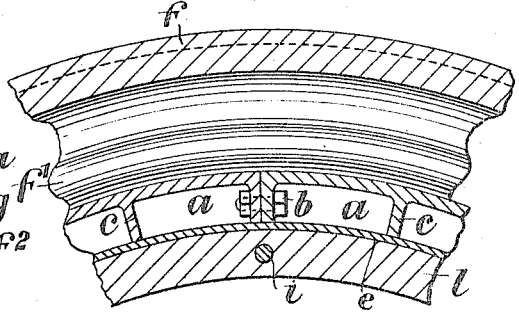
Fig. 2 is a sectional elevation on the line II—II, Fig. 1.
Figure 3:
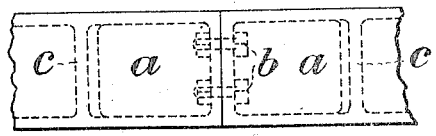
Fig. 3 is a plan of the abutment.

As an example of a suitable construction made according to this invention, and as shown in Figs. 1, 2 and 3, a distance piece or abutment $a$ is made of metal and of channel section in one piece or two or more parts the ends of which are joined together by bolts $b$ and it is moreover provided with stiffening ribs or diaphragms $c$. The distance piece $a$ is, as shown in Fig. 1, formed outwardly with an arched peripheral surface, the opposite or inner surface being, say, flat or cylindrical or otherwise to seat upon the rim $e$ of the wheel. The tire $f$ is hollow, provided with opposite inwardly projecting annular ridges $f'$ $f'$, and the base portions or feet $f^2$ $f^2$ are received in spaces between the flanges $g$ $h$ of the rim $e$ and the distance-piece $a$. In this construction the rim $e$ is provided with one flange $g$ to grip the base or foot of the tire at one side and another flange $k$ for attachment to the felly. The flange $h$ holds the tire on the other side and has integral therewith a flange $m$ for attachment to the felly. Bolts $i$ pass through the flange $k$, the felly $l$ and the flange $m$ and, by means of nuts $i'$ when screwed up tight, securely hold or clamp the tire in position on the felly.

When the tire is compressed and subjected to considerable lateral stress, part of the surface of one side-wall (say the lower surface in the vicinity of the inner end of the leader line of one or both of the annular ridges $f'$) comes into contact with part of the curved surface and not far from the middle or crown of the distance piece or abutment $a$ and further deformative movement or lateral deformation of all or part of the said side wall or walls is resisted on such contact or engagement taking place. The contact or contacts just mentioned do not ordinarily occur when the tire is not greatly compressed nor subjected to lateral stress, but according to this invention, contacts occurring through the effects of load and lateral stress are designed to prevent deformation from being excessive because excessive deformation would reduce the resilience of the tire and injure the walls thereof. While, primarily, the object of the invention is to obviate the necessity for connecting or bracing the sides of the tire to prevent collapse or to offer resistance to excessive deformation, it is clear that in certain cases, tires constructed according to this invention may have their sides laced or connected together and, particularly, in the case of relatively light tires.

The rim may be a bonding band, as shown, and the flanges $g$ and $h$ may be fitted so that the base portions or feet $f^2$ $f^2$ of the tire may be firmly compressed and tightly gripped between such flanges and the abutment or distance piece $a$. The bases or feet of the tire may be strengthened or reinforced.

Figures 4, 5, 6, 8:
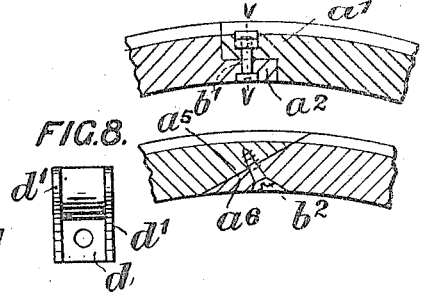
Fig. 4 is a sectional elevation of a modified form of an abutment.
Fig. 5 is a transverse section on the line V—V, Fig. 4.
Fig. 6 is a sectional elevation of an abutment showing another method of joining the ends or sections of such an abutment.
Fig. 8 is a side elevation of a clip or bracket for aiding in securing a bonding rim to the felly of the wheel.

The abutment or distance piece is as shown in Figs. 4 and 5 made of wood or other suitable material and in sections the extremities $a'$ $a^2$ which are partly cut away or formed so as to lap over each other and these extremities are joined by means of bolts $b'$. In this case the upper surface of the abutment is somewhat angular and the opposite edges are rounded off at $a^4$ $a^4$ so as not to cut the interior of the tire when the latter becomes deformed under a load or lateral stress.

The construction of abutment shown in Fig. 6 is similar except that the ends are scarfed at $a^5$ $a^6$ and connected by screws $b^2$.

Figure 7:
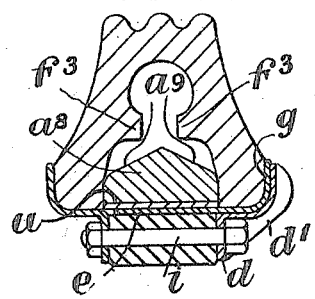
Fig. 7 is a transverse section of a modified form of tire.

As shown in Fig. 7, a rigid or hard abutment $a^8$ may be separated from the rim $e$ by an annulus or strip or strips $u$ of rubber. The opposite vertical sides and the lower surfaces of the ridges $f^3$ $f^3$ are approximately rectangular and, normally, the lower sides are at some distance from the surface of the abutment $a^8$, which has two surfaces $a^9$ $a^9$, angular to each other for being engaged by, or to serve as, abutments to the edges of the ridges $f^3$ $f^3$, and when distortion takes place, the said edges, or one of them, come, or comes, into contact with the surface or surfaces $a^9$ near the apex of said distance-piece. In this construction, the rim $e$ with flange $g$ is held in place by brackets or clips $d$ (see also Fig. 8) stiffened by radial ribs $d'$ and furnished with bolts $i$.

Figure 9:
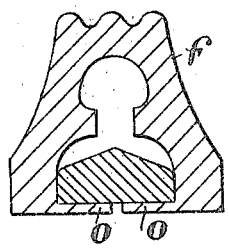

Or, as shown in Fig. 9, the rubber strips may be underlaps $o$ $o$ extending from the respective walls of the tire $f$ or, obviously only one foot of the tire may be provided with a strip or underlap of a width corresponding to that of the two feet together.

Figure 10:
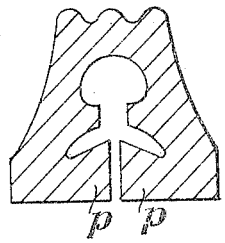

Or, as shown in Fig. 10, the abutment or distance piece may be embodied in the feet or base portions $p$ $p$ of the tire.

As shown in Figs. 11 and 12, instead of forming the surface of the distance piece $a^{10}$ with a plain convex surface, it may be formed with radial ribs or corrugations $a^{11}$ or with bosses or other protuberances for the purpose of increasing the aforesaid resistance to the deformation or distortion of the tire when the said surface is engaged by the ridge or ridges $f'$ of the tire.

Alternatively, or in addition, and as shown in Figs. 13 and 14, the inner surface of the side walls of the tire $f$ may be formed with radial ribs or protuberances $r$, which, under the tendency of the tire to excessive distortion, will engage the surface of the abutment $a^{12}$, in order to resist undue deformation or collapse as aforesaid. The dotted line in the abutment marked $a^{11}$ indicates the depth of the ribs or protuberances around the abutment, if so fashioned.

The construction shown in Fig. 15 comprises a tire $f$, of which the feet $f^4$ are formed as shown in cross section, the abutment $a^{13}$ having a recess $t$ on each side and the bonding flanges $n$ are made to correspond to the outer contour of the feet. The flanges $s$ are suitably bolted to the felly $l$ by bolts $i$.

As shown in Fig. 16, the abutment $a^{14}$ is hollow and stiffened or strengthened by a central annular rib $a^{15}$. The tire is held in position by means of bonding flanges $n'$ $n'$ and clips comprising a rectangular centrally perforated base $d^2$ and ribs $d^3$ (see also Fig. 17).

The construction shown in Fig. 18 is very similar to that shown in Fig. 16 except that the outside of the tire is furnished on each side with an annular recess $f^5$ and the bonding flange $n^2$ and bonding rim $n^3$ have their outer edges bent or curled over to correspond to the lower faces of the said recesses $f^5$.

Finally as shown in Fig. 19 the twin tires $f$ $f$ are each mounted on flanged rims $e'$ on the felly $l'$ and the bonding flanges $g'$ are secured by bolts $i'$ passing through them and the felly $l'$.

When the ridges (with or without ribs or protuberances such as $r$, Figs. 13 and 14) are formed inside of the tire, and particularly when they are so formed between the base and tread of the tire, the resultant thickening of the walls of the tire enables the said walls to offer a certain amount of resistance to the tendency of the tire to bulge or collapse outwardly, while the distance piece or abutment has the effect of stopping any excessive collapsing of the walls inwardly, because a small amount of movement inwardly of the said ridges causes them to come to rest or to abut against the distance piece, thereby restraining further distortion of the tire.

In all cases the tires shown are provided with a tread having three annular parallel ribs and such a formation gives a good grip on the road and prevents side slip but obviously treads of other formation may also be employed.

I claim:

1. A cushion tire, comprising a tread-portion, and base portions, side walls thickened between the tread-portion and the base portions, and an annular arch-like abutment concentric with the said tread-portion and situated in the region between the thickened portions and the base-portions, said thickened portion adapted to contact with the abutment only when the tire is compressed, substantially as set forth.

2. A cushion tire, comprising a tread portion and base portions, side walls thickened between the tread and base portions, and an annular arch-like abutment concentric with said tread-portion and situated in the region between the thickened portions and the base portions, said thickened portions being out of contact with each other and adapted to contact with the abutment only when the tire is compressed.

3. A cushion tire comprising a tread portion and base portions, side walls each having an internal annular ridge between the tread and base portions, and an annular arch-like abutment having transverse radial ribs situated between the ridges and the base of the tire, said ridges adapted to contact with the ribs on the abutment only when the tire is compressed.

4. A cushion tire comprising a tread portion and base portions, side walls having internal annular ridges and radial ribs between the tread and base portions, and an annular arch-like abutment having transverse radial ribs situated between the ridges and the base of the tire, said ridges and ribs adapted to contact with the abutment only when the tire is compressed.

WILLIAM EVANS HUGH HUMPHREYS.